United States Patent [19]

Labonville

[11] 4,243,088
[45] Jan. 6, 1981

[54] SKIDDER RING AND CHAIN CONNECTING MEANS

[76] Inventor: Emilien Labonville, RFD 1, Berlin, N.H. 03570

[21] Appl. No.: 60,980

[22] Filed: Jul. 26, 1979

[51] Int. Cl.³ .............................................. B60C 27/00
[52] U.S. Cl. ................................ 152/223; 24/73 AC; 24/73 CE; 24/116 R; 59/93; 152/225 R; 152/228; 152/242; 403/154; 403/157; 411/530
[58] Field of Search .............. 152/223, 225 R, 225 C, 152/228, 230, 243, 244, 242, 170, 172, 189; 59/93, 86, 78; 403/154, 157; 305/19, 53; 301/42, 44 T; 24/73 AC, 73 CE, 116 R, 116 A; 278/52, 65, 96; 294/78 R, 78 A; 85/5 CP, 5 N

[56] References Cited

U.S. PATENT DOCUMENTS

| | | | |
|---|---|---|---|
| 793,618 | 6/1905 | Smith | 152/243 X |
| 2,052,893 | 9/1936 | O'Konesky | 152/228 |
| 3,500,887 | 3/1970 | Woodward | 152/230 |
| 3,664,122 | 5/1972 | Linnenbank | 59/93 |

Primary Examiner—John T. Goolkasian
Assistant Examiner—Thomas E. Bokan
Attorney, Agent, or Firm—C. Yardley Chittick

[57] ABSTRACT

Means for improving the traction of wheeled equipment used in the logging industry comprising an improved skidder ring with clevises to which the connecting tag chains are fastened by a pin preferably secured in place by a spot of welding material. When a tag chain breaks and must be replaced, the pin is severed by a torch permitting the remaining two pin parts to be removed from the clevis. The end link of the replacement or repaired tag chain is secured by a new pin placed in the clevis. A spot of welding material is applied to the pin to hold it in place.

5 Claims, 5 Drawing Figures

SKIDDER RING AND CHAIN CONNECTING MEANS

BACKGROUND OF THE INVENTION

In the logging industry, the tractors used to haul logs and move logging machinery from place to place regularly encounter ground conditions so bad that wheel traction is very uncertain. This is true even though very large tires with non-skid treads are used.

Accordingly, it has been customary to apply to the tires large size anti-skid traction units (known as skidders or skidder rings) which are held in place on the tires by heavy duty tag chains, connecting chains and side chains. In spite of the heavy duty chains that are used, the extreme conditions to which the equipment is subjected result in occasional chain breakage. The most common chain breakage occurs in the tag chains that connect the skidders. The tag chains come into direct contact with the ground as the wheel rotates, resulting in continuous and ralatively rapid wear.

In the construction of the skidders now in general use, there are four eyes in which the end links of the tag chains are placed and secured by welding the eye or the end link in closed position. To replace a broken tag chain, it is necessary to perform a welding operation which usually is difficult to do under the normal working conditions in the woods. If the repair cannot readily be made at the site, then the entire traction unit must be removed from the wheel to be replaced by another complete unit, if available.

SUMMARY OF THE PRESENT INVENTION

The present invention comprises two parts. First, there is an improved skidder ring which when mounted with others around the tire, greatly increases the traction of the wheel. Secondly, through the use of clevises on the skidder ring (instead of the conventional eyes) coupled with a new procedure for securing the pins in the clevises, it becomes possible to replace a broken tag chain in a matter of minutes. This is an important advantage because absence of the skidder rings on a wheel might make it impossible for a tractor to continue operation at the location where the chain break occurred.

DESCRIPTION OF A PREFERRED EMBODIMENT

It will be understood that the wheels of the tractors with which this invention is concerned are very large. Accordingly, the skidder rings and the chains that hold the rings in place are heavy, rugged and expensive pieces of equipment which should have relatively long life to justify the cost. Therefore strength of the parts and ease of repair and replacement. are important considerations.

Figure 1:
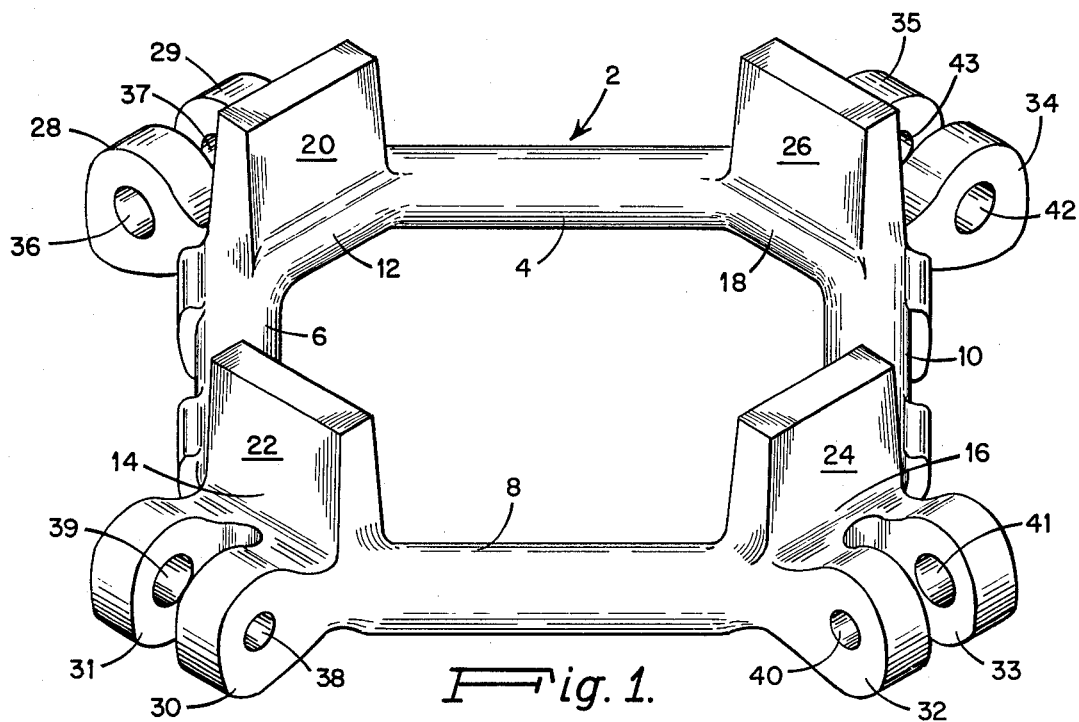
FIG. 1 is a perspective view of the improved skidder ring.

In FIG. 1 is shown in perspective an individual skidder ring generally referred to at 2. The supporting frame is octagonal with the sides 4, 6, 8 and 10 being about 4 inches long and 1 inch in diameter. The shorter corner sections 12, 14, 16 and 18 are about 2½ inches long and carry heavy upstanding lugs 20, 22, 24 and 26 about 2½ inches long, 1¾" high and tapering upward from about ¾ inch thick at the base to ½ inch at the top. Adjacent lugs are at right angles to each other and at 45° more or less to the periphery of the wheel. The unit is made of high grade alloy steel and weighs about 14 pounds.

The above figures are not to be considered as in any way limiting but are given so that there will be some appreciation of the overall weight and forces involved when a substantial number of units (usually 10, 11 or 12) with their connecting and supporting chains are mounted on a tractor wheel.

At the exterior of each of the short sides 12, 14, 16 and 18 are clevises comprised of pairs of ears 28–29, 30–31, 32–33 and 34–35. The ears have respectively aligned circular holes 36–37, 38–39, 40–41 and 42–43 adapted to receive a chain securing pin 44 not shown in FIG. 1 but shown in FIGS. 4 and 5. Each pair of ears forming one clevis are at right angles to the pair of ears forming the next adjacent clevis. From the drawings, it is apparent that the ears are at right angles to the plane of the ring and the bores being in the plane of the ring.

Figure 4:
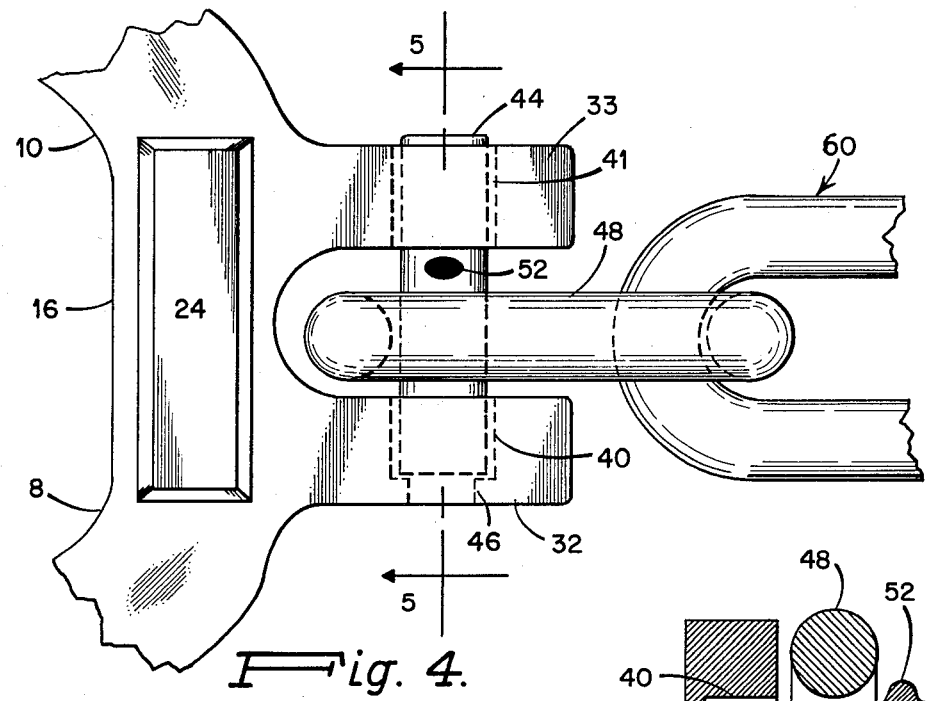
FIG. 4 is a plan view of one of the clevises connected to the end link of a tag chain showing the spot weld pin securing means.
Figure 5:
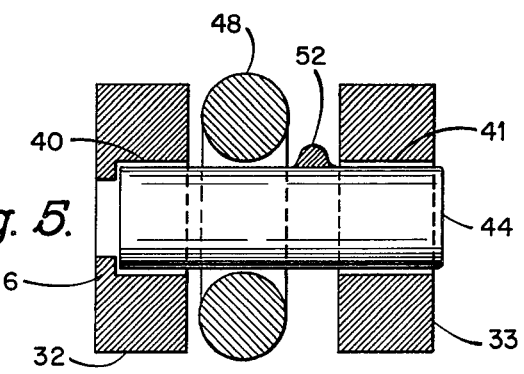
FIG. 5 is a vertical section taken on the line 5—5 of FIG. 4.

Referring now to FIGS. 4 and 5, it will be noted that holes 40 and 41 are aligned and of the same diameter. However hole 40 does not extend all the way through ear 32, stopping short at a shoulder 46. Thus when pin 44, slightly smaller in diameter than holes 40 and 41, is placed in the ears, it must enter through ear 33 and can go no further than shoulder 46 in ear 32.

The procedure in securing the end link of a skidder ring connecting chain (known in the trade as a tag chain) to a clevis will now be explained. As seen in FIGS. 4 and 5, the end link 48 of tag chain 60 (of which only two links are shown) is placed between ears 32 and 33. Pin 44 is then inserted in the ears, passing through link 48. Shoulder 46 limits movement of pin 44 through ear 32. To prevent the backing out of pin 44 from its position in holes 40 and 41, a spot of welding material 52 is applied to pin 44 at a location between link 48 and ear 33. This bit of weld material is fully adequate to maintain pin 44 in its chain connecting position. The diameter of the chain stock is always sufficiently less than the space between the clevis ears to permit the placing of the spot of weld material on pin 44.

The foregoing procedure is used at each of the four clevises on each skidder ring to secure the related tag chains thereto.

Figure 2:
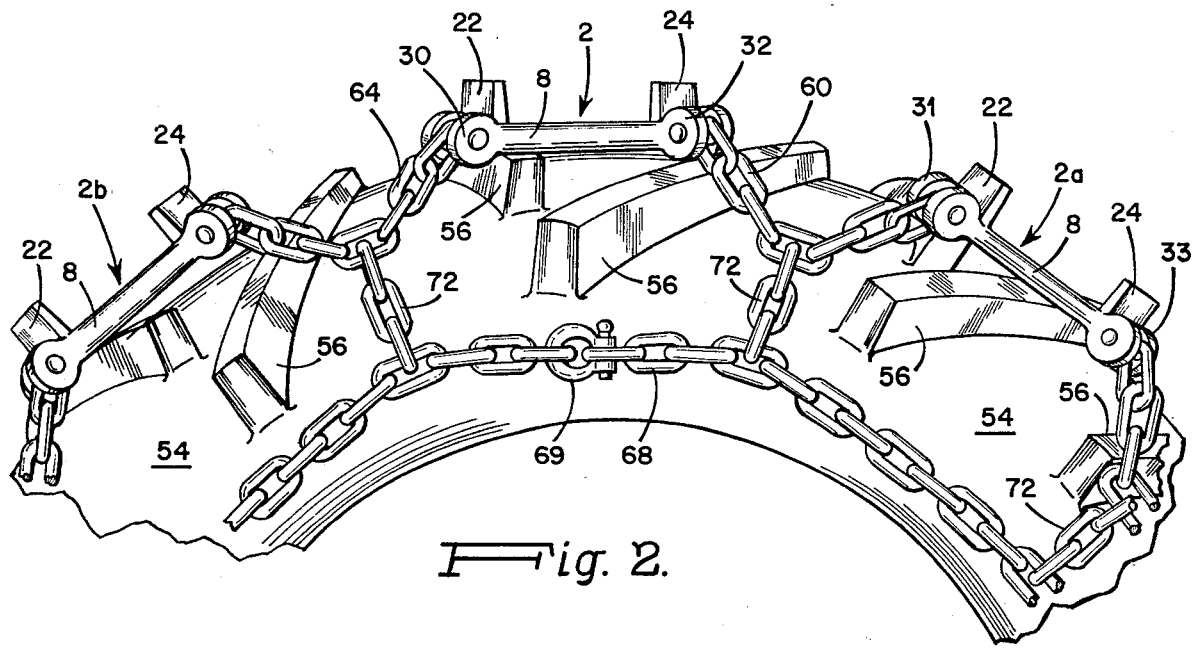
FIG. 2 is a fragmentary side elevation showing three skidder rings mounted on a tractor tire.
Figure 3:
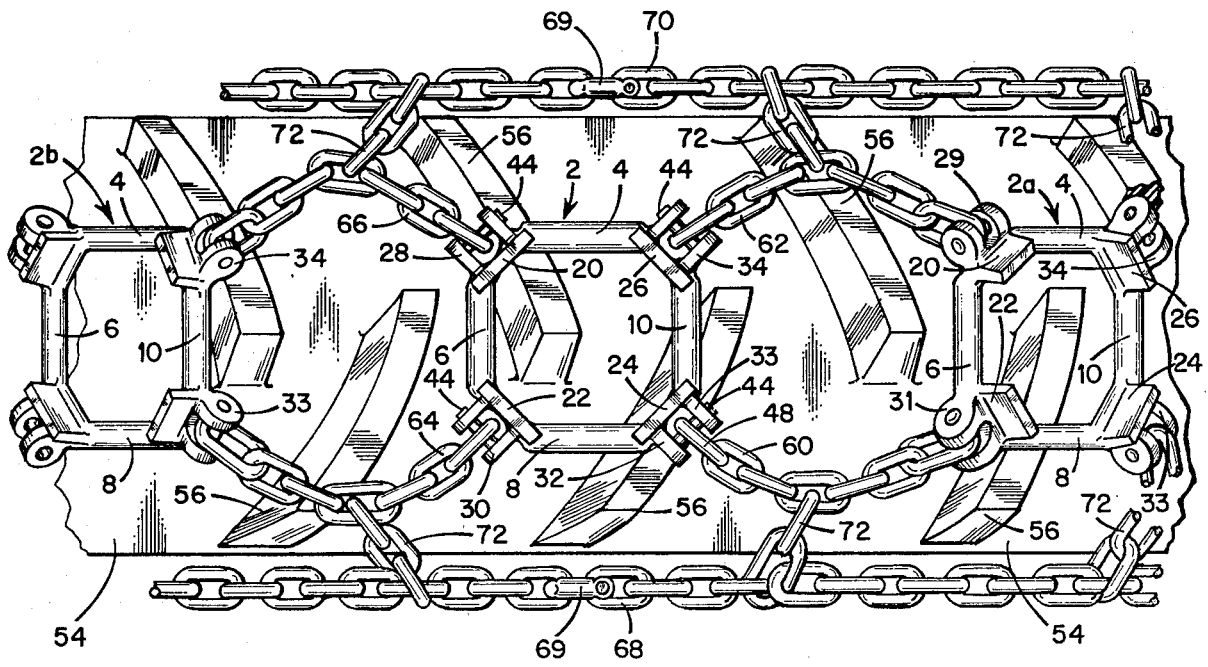
FIG. 3 is a plan view of FIG. 2.

Referring now to FIGS. 2 and 3, the manner in which the skidder ring are mounted on the tire of the tractor wheel will be explained.

The tire is shown at 54 in fragmentary side elevation. Three rings 2, 2a and 2b are shown in position with the sides 8 nearest the viewer. The rings are resting on the anti-skid ribs 56 of tire 54. Ring 2 is connected to ring 2a by tag chains 60 and 62 and to ring 2b by tag chains 64 and 66. The end links of all of the tag chains are secured to the respective clevises by pins 44 in the manner shown in FIGS. 4 and 5. The rest of the skidder rings around the tire are connected together in the same manner.

In order to keep the connected skidder rings in place on the outer circumference of the tire, conventional side chains 68 and 70 are used. Each of these chains includes at least one and preferably two shackles 69 or equivalent, permitting the side chains to be temporarily separated to facilitate installation of the unit on the wheel. Chains 68 and 70 are connected to the tag chains 60, 64 and 62, 66 by intermediate radial connecting chains 72. Chains 72 pull the tag chains radially inwardly to cause substantial deflection of the tag chains. To accommodate this angular pull of the tag chains, the clevises are set at a substantial angle to the wheel periphery, as is plainly shown in the drawings.

It will be understood that the size and number of links in each chain shown in the drawings are not to scale and are for illustrative purposes only.

Connecting chains 72 may include shackles (not shown) so that upon the breaking of one of the tag chains such as chains 60, 62, 64, 66, the damaged part may readily be removed to be repaired or replaced by a new chain.

If a tag chain breaks at an intermediate link, it then becomes necessary to remove the end links of the tag chains from their respective clevises. This is accomplished in the following manner. A welding torch (which is usually included in the tool set of a logging tractor) is used to burn away the mid portion of pin 44 between the supporting ears such as ears 32 and 33 shown in FIGS. 4 and 5. The end link of the tag chain will then fall free of the clevis. The remaining parts of pin 44 in the clevis ears may then be pushed inwardly through the holes 40 and 41 to fall free. With the space between ears 32 and 33 now clear, the end link 48 of the tag chain is then put in position between the ears and secured by a new pin 44 which preferably is locked in place by the addition of a new spot of weld material 52. When the side chains and intermediate connecting chains are reconnected (if they had been disconnected during the repair operation at the ring clevis) the tractor is then ready to resume operation.

If a tag chain fails at the end link, which often happens because of the excess wear at this point, then the clevis pin 44 is burned away and removed as explained above. However, due to stretching of the tag chains while in use, it is often possible to continue in use the same tag chain (less the broken link) as its increased length will permit it to extend to and be connected to the open clevis by a new pin 44. Upon reconnecting of the side chains and connecting chains, operation of the tractor may be resumed.

It should also be noted that while the lugs and clevises are shown as integral parts of the same alternate sides of the skidder ring, the construction could be modified without departing from the invention by having the lugs on one set of alternate sides, such as sides 4, 6, 8 and 10 with the clevises remaining on sides 12, 14, 16 and 18. Traction wise, however, this would be a less efficient arrangement.

It is intended to cover all changes and modifications of the example of the invention herein chosen for purposes of disclosure which do not constitute departures from the spirit and scope of the invention.

I claim:

1. Means for connecting a chain link to a skidder ring, said means comprising
    a clevis integral with and extending outwardly from said ring, said clevis comprising a pair of spaced parallel ears forming an opening therebetween substantially greater than the thickness of the chain link that is to be connected thereto,
    said ears having aligned bores therein and a clevis pin in said bores within the end link of said chain,
    means in one of said ears for stopping the travel of said pin through said one ear and
    means for preventing removal of said pin from said ears comprising a spot of welding material applied to said pin at a position between the inner side of the other of said ears and the said link.

2. A skidder ring for use on wheels of vehicles used in the logging industry,
    said ring comprising an eight sided body,
    lugs on alternate sides of said ring,
    clevises extending outwardly from said lugs, each clevis comprised of a pair of parallel ears with aligned bores therethrough,
    the axes of said bores being in the plane of said ring,
    each pair of said bores adapted to receive a clevis pin.

3. The construction set forth in claim 2,
    said adjacent lugs being at right angles to each other and said adjacent clevises being at right angles to each other.

4. An antiskid construction for use on the wheels of vehicles used in the logging industry, said construction comprising
    a plurality of skidder rings adapted to be mounted in spaced relation about the tire of a vehicle wheel,
    each skidder ring comprising an eight sided metal bar having four upstanding metal lugs, said lugs being integral with alternate sides of said ring,
    four clevises, each comprised of a pair of ears extending outwardly from each said lug, said ears being at right angles to the plane of said ring,
    pairs of tag chains connecting adjacent pairs of ears of each ring with adjacent pairs of ears of the next adjacent ring,
    the means of connection of each end link of each said tag chain with said ears comprising aligned bores through said ears,
    the axes of said bores lying in the plane of said ring and being parallel to the long dimension of its adjacent lug,
    a clevis pin positioned in said bores and through the end link of a said chain positioned between said ears,
    means on one ear for limiting the travel of said clevis pin through said bores,
    means comprising a deposit of welding material on said clevis pin at a position between said end link and the other of said ears for preventing the removal of said clevis pin from said bores
    and other chains connected to said tag chains for maintaining said skidder rings in position on said wheel.

5. The construction set forth in claim 4, adjacent clevises being generally at 90° to each other and each said tag chain being deflected by another chain connected to the middle part of said tag chain, whereby the pull of each end of said tag chain will be in a direction generally in alignment with the ears of the clevis to which said end is connected.

* * * * *